United States Patent Office

Re. 28,112
Reissued Aug. 13, 1974

28,112
COLOR PHOTOGRAPHIC ELEMENTS AND PROCESS

Charles O. Edens and John H. Van Campen, Rochester, N.Y., assignors to Eastman Kodak Co., Rochester, N.Y.

No Drawing. Original No. 3,582,322, dated June 1, 1971, Ser. No. 736,010, June 11, 1968. Application for reissue Oct. 19, 1973, Ser. No. 408,234
Int. Cl. G03c 7/16
U.S. Cl. 96—22 20 Claims

Matter enclosed in heavy brackets [ ] appears in the original patent but forms no part of this reissue specification; matter printed in italics indicates the additions made by reissue.

ABSTRACT OF THE DISCLOSURE

Color photographic elements containing differently sensitized silver halide emulsions, a nondiffusible yellow dye-forming coupler that reacts with an oxidized primary aromatic amine color developing agent to form a yellow dye and substantially no uncolored form of the yellow dye, a 5-pyrazolone coupler, a cyan dye-forming coupler and hydrophilic colloids that are *hardened with divinylsulfone hardening agent* [substantially free of aldehyde hardening agents] and substantially free of *aldehyde and* aldehyde-releasing hardening agents are advantageously color processed by color development step followed by a blix step to produce good dye image densities with substantially no uncolored forms of the dyes being present.

This invention is related to color photography, color photographic elements that contain incorporated color-forming couplers and shortened photographic processes that produce photographic reproductions of improved color quality in these elements.

Multicolor, multilayer photographic elements are well known in the art of color photography. Usually these elements have three selectively sensitized emulsion layers coated on one side of a single support. For example, the outermost layer is generally blue-sensitive. The next layer is generally green-sensitized and the layer adjacent to the support is generally red-sensitized. Between the blue-sensitive and the green-sensitized layer a bleachable yellow colored filter layer is often used for absorbing blue radiation that may be transmitted through the blue-sensitive layer. The multilayer coatings can also have other interlayers for specialized purposes. Such multilayer materials have been previously described in the prior art, such as, Mannes et al. U.S. Pat. 2,252,798, issued Aug. 19, 1941. Other arrangements of the sensitive layers are also known. Usually the blue-sensitive layer, the green-sensitized layer and the red-sensitized layer are used to produce the yellow dye image, magenta dye image and the cyan dye image, respectively. Open-chain ketomethylene, pyrazolone and phenolic (and naphtholic) couplers are usually used for forming the yellow, magenta and cyan dye images, respectively. The couplers are incorporated in the appropriately sensitized layer of the photographic elements.

Multicolor photographic elements are also known in which the blue-sensitive silver halide emulsion and the yellow dye-forming coupler are contained in a blue-sensitive yellow dye-forming packet, a green-sensitized silver halide emulsion and magenta dye-forming couplers are contained in a green-sensitized magenta dye-forming packet and a red-sensitized silver halide emulsion and cyan dye-forming coupler are contained in a red-sensitized cyan dye producing packet and these three different packets are dispersed in a single light-sensitive layer.

In the usual method for processing of exposed multicolor coupler incorporating color-forming photographic elements the color developing bath is generally followed by consecutive baths comprising a fix, a bleach, and a second fix with an intervening wash step between each of the indicated baths. As is well known, the fix bath is employed to remove the undeveloped silver halide from the developed emulsion layer while the bleach bath is employed to oxidize the metallic silver formed by development of the latent image in the silver halide. The second fix is normally employed to remove the silver halide formed by the previous bleaching step so that the emulsion layer or layers are cleared of residual silver and silver halide. This leaves essentially a colored image of cyan, magenta and yellow dye densities as formed at the time of development by coupling of the incorporated couplers with oxidation products of a primary aromatic amino developing agent contained in the color developing bath.

It is known to shorten the time required for processing color-forming elements by color developing, washing, blixing, bleaching, and washing. Blixing is done with a single solution that combines the bleach and fix. Attempts to eliminate the bleach step following the blix have been unsuccessful with conventional coupler incorporating photographic elements because of low yellow dye density produced in the blue-sensitive layer and low magenta dye density produced in the green-sensitized layer. It is believed that substantial amounts of the uncolored form of the yellow dye image formed by color development and the uncolored form of the magenta dye image formed by color development are not oxidized to the yellow colored dye and the magenta colored dye, respectively, by the blix so that it is necessary to use a bleach step following the blix to convert the noncolored forms of these two dyes to the desired colored dyes in order to obtain the yellow dye density and magenta dye density required.

Coupler incorporated multicolor photographic elements are desired which will produce the desired yellow and magenta dye densities with a shortened color process in which it is not necessary to use a separate bleach step when a blix step is used.

It is therefore an object of our invention to provide a novel shortened color process requiring only the color development step and a blix step followed with a wash that produces good quality color reproductions in our novel multicolor photographic element containing incorporated color-forming couplers.

It is another object of our invention to provide our novel multicolor photographic elements which contain incorporated color-forming couplers and which will produce good quality color reproductions even when processed in our novel shortened color process which requires only a color developing step and a blix step followed with a wash.

Another object is to provide a novel color photographic element which is substantially free of aldehyde hardening agents and hardening agents which release aldehyde, the said element containing incorporated color-forming couplers which do not form uncolored forms of the yellow dye and uncolored forms of the magenta dye during color development so that this element will produce color reproductions with the desired yellow dye density and desired magenta dye sensitivity even when processed in our novel color process which requires only the color developing step and a blix step with wash following the blix.

Still other objects will be apparent from the following specification and claims.

These and still other objects are accomplished by preparing and using our multicolored photographic elements and by processing them with our shortened color process.

n one of its simplest forms our element comprises a photographic element having coated thereon a hydrophilic colloid containing a first silver halide emulsion sensitive to one region of the visible spectrum and contiguous to said first silver halide emulsion a nondiffusible ketomethylene open-chain yellow dye-forming coupler that reacts with oxidized primary aromatic amine color developing agent to form a yellow dye and substantially no uncolored form of said yellow dye which is not converted to the yellow dye by a blix solution following color development, and a second silver halide emulsion sensitive to a second region of the visible spectrum and contiguous to said second silver halide emulsion a nondiffusible 5-pyrazolone coupler (preferably aldehyde reactive) which reacts with oxidized primary aromatic amine color developing agent to form a magenta dye, said photographic element being substantially free of aldehyde hardening agents and substantially free of aldehyde releasing hardening agents. In another embodiment the photographic element of our invention contains in addition to a first and a second silver halide emulsion described above, a third silver halide emulsion sensitive to a third region of the visible spectrum and contiguous to said third silver halide emulsion a nondiffusible phenolic or naphtholic coupler which reacts with primary aromatic amine color developing agents to form a cyan dye. In one embodiment of our invention the photographic element comprises a support coated in succession with a red-sensitive silver halide emulsion layer containing a phenolic or naphtholic coupler, a green-sensitized silver halide emulsion containing a 5-pyrazolone coupler (preferably aldehyde reactive) and a blue-sensitive silver halide emulsion layer containing the ketomethylene open-chain yellow dye-forming coupler. A bleachable yellow colored blue light-absorbing filter layer is advantageously placed between the green-sensitized layer and the top blue-sensitive layer. In other embodiments of our invention the light-sensitized layers are placed on the support in different orders than described above. In another embodiment of our invention, the three differently sensitized silver halide emulsions containing the appropriate dye-forming couplers are dispersed as packets in a single light-sensitive layer. For example, the blue-sensitive silver halide emulsion containing the yellow dye-forming coupler is incorporated in yellow image-forming packets, the green-sensitized silver halide emulsion and magenta dye-forming coupler contained in magenta image-forming packets and the red-sensitized silver halide emulsion containing the cyan dye-forming coupler is contained in cyan dye image-forming packets.

Our photographic elements are adavntageously processed after exposure, by development in an aqueous alkaline solution in the presence of a primary aromatic amine color developing agent, followed by a blix comprising a silver halide solvent and an oxidizing agent for silver. A water wash is sometimes advantageously used between the development and blix steps. The developed and blixed photographic material is then advantageously washed and dried or washed and given a stabilizing bath treatment before drying. Our process, as described above, produces excellent dye images with substantially no uncolored form of yellow dye and substantially no uncolored form of magenta dye being present in the processed photographic material. Our photographic materials provide a valuable technical advance since they are substantially free of uncolored forms of yellow dye and substantially free of uncolored forms of magenta dye when they leave the blix solution and they do not need to have a separate bleach following the blix in order to obtain the desired yellow and magenta dye densities. Prior art photographic materials require a separate bleach and separate fix, or a separate bleach following the blix solution in order to obtain the desired magenta and yellow dye densities. Our photographic materials can be processed, if desired, by using a bleach following the blix or by using a separate bleach and a separate fix in place of the blix solution, however, such processes are longer and it is generally desired to use the shortest process possible that is required to obtain the desired photographic quality.

The light-sensitive layers of our photographic elements are advantageously coated on a wide variety of photographic emulsion supports. Typical supports used to advantage include cellulose nitrate film, cellulose acetate film, polyacetal film, polystyrene film, polyterephthalate film, polyethylene film and related films of resinous materials as well as paper, glass and others.

Hydrophilic colloids used to advantage include gelatin, colloidal albumin, a cellulose derivative, or a synthetic resin, for instance, a polyvinyl compound. Some colloids which may be used are polyvinyl alcohol or a hydrolyzed polyvinyl acetate as described in Lowe U.S. Pat. 2,286,215, issued June 16, 1942; a far hydrolyzed cellulose ester, such as cellulose acetate hydrolyzed to an acetyl content of 19–26% as described in Lowe et al.: U.S. Pat. 2,327,808, issued Aug. 24, 1943; a water-soluble ethanolamine cellulose acetate as described by Yutzy U.S. 2,322,085, issued June 15, 1943; a polyacrylamide having a combined acrylamide content of 30–60% and a specific viscosity of 0.25–1.5 or an imidized polyacrylamide of like acrylamide content and viscosity as described in Lowe et al. U.S. Pat. 2,541,474, issued February 13, 1951; zein as described in Lowe U.S. Pat. 2,563,791, issued Aug. 7, 1951, a vinyl alcohol polymer containing urethane carboxylic acid groups of the type described in Unruth et al. U.S. Pat. 2,768,154, issued Oct. 23, 1956, or containing cyano-acetyl groups, such as the vinyl alcohol-vinyl cyano-acetate copolymer as described in Unruth et al. U.S. Pat. 2,808,-331, issued Oct. 1, 1957; or a polymeric material which results from polymerizing a protein or a saturated acylated protein with a monomer having a vinyl group as described in Illingsworth et al. U.S. Pat. 2,852,382, issued Sept. 16, 1958.

The hydrophilic colloids described above are used in various layers of our photographic elements are advantageously hardened with hardenings agents, such as, aziridine hardeners, isoxazolium salt hardeners, epoxy hardeners and vinyl sulfone hardeners.

Any of the photographic silver halide emulsions, e.g., silver bromide, silver bromoiodide, silver chloride, silver chlorobromide, silver bromochloroiodide, etc., used in photography can be used to advantage in our photographic materials.

The emulsions used in the photographic element of our invention can be chemically sensitized by any of the accepted procedures. The emulsions can be digested with naturally active gelatin, or sulfur compounds can be added, such as those described in Sheppard U.S. Pat. 1,574,944, issued Mar. 2, 1926; Sheppard et al. U.S. Pat. 1,623,499, issued Apr. 5, 1927; and Sheppard et al. U.S. Pat. 2,410,689, issued Nov. 5, 1946.

The emulsions can also be treated with salts of the noble metals, such as ruthenium rhodium, palladium, iridium and platinum, as described in Smith et al. U.S. Pat. 2,448,060, issued Aug. 31, 1948, and as described in Trivelli et al. U.S. Pats. 2,566,245 and 2,566,263, both issued Aug. 28, 1951.

The emulsions can also be optically sensitized with cyamine and merocyanine dyes, such as those described in Brooker U.S. Pats. 1,846,301, and 1,846,302, both issued Feb. 23, 1932; and 1,942,854, issued Jan. 9, 1934; White U.S. Pat. 1,990,507, issued Feb. 12, 1935; Brooker and White U.S. Pats. 2,112,140, issued Mar. 22, 1938; 2,165,-338, issued July 11, 1939; 2,493,747, issued Jan. 10, 1950; and 2,739,964, issued Mar. 27, 1956; Brooker et al. U.S. Pat. 2,493,748, issued Jan. 10, 1950; Sprague U.S. Pats. 2,503,776, issued Apr. 11, 1950, and 2,519,001, issued Aug. 15, 1950; Heseltine et al. U.S. Pat. 2,666,761, issued Jan. 19, 1954; Heseltine U.S. Pat. 2,734,900, issued Feb. 14, 1956; Van Lare U.S. Pat. 2,739,149, issued Mar. 20, 1956; and Kodak Limited British 450,958, accepted July 15, 1936.

The emulsions may also contain speed-increasing compounds of the quaternary ammonium type of Carroll U.S. Pat. 2,271,623, issued Feb. 3, 1942; Carroll et al. U.S. Pat. 2,288,226, issued June 30, 1942; and Carroll et al. U.S. Pat. 2,334,864, issued Nov. 23, 1943; and the polyethylene glycol type of Carroll et al. U.S. Pat. 2,708,162, issued May 10, 1955.

The emulsions can also be chemically sensitized with gold salts as described in Waller et al. U.S. Pat. 2,399,083, issued Apr. 23, 1946, or stabilized with gold salts as described in Damschroder U.S. Pat. 2,597,856, issued May 27, 1952; and Yutzy et al., U.S. 2,597,915, issued May 27, 1942. Suitable compounds are potassium chloroaurite, potassium aurithiocyanate, potassium chloroaurate, auric trichloride and 2-aurosulfobenzothiazole methochloride.

Any nondiffusible ketomethylene open-chain yellow dye-forming coupler that reacts with primary aromatic amine color developing agent to form a yellow dye and substantially no uncolored form of said yellow dye that will not be converted to the yellow colored form of the dye by our blix solution is advantageously used in our photographic materials. These couplers include all of the well known nondiffusing open-chain ketomethylene yellow dye-forming couplers that have a coupling-off groups substituted on the active carbon atom. The parent couplers from which these couplers are derived include the cyanoacetyl couplers, the acylacetyl couplers such as, the acylacetanilide couplers (e.g., the alkoylacetanilide couplers, the aroylacetanilide couplers, the pivalylacetanilide couplers, etc.), the acrylacetamide couplers (e.g., the alkoylacetamide couplers, the aroylacetamide couplers, the pivalylacetamide couplers, etc.), etc. Certain of the parent couplers having two hydrogen atoms on the active carbon atom are used to advantage.

The preferred yellow dye-forming couplers used according to our invention include those advantageously represented by the formula:

I. $$R-\overset{O}{\overset{\|}{C}}-\overset{X}{\overset{|}{C}}H-Y$$

wherein R represents an alkyl group (substituted or not), an aromatic group (substituted or not), a heterocyclic group (substituted or not), etc.; and X represents the cyano group, a carbamyl group (substituted or not), etc. Usually R and/or X contains substituents which ballast the coupler to make it nondiffusing. Solubilizing groups are advantageously used on ballasted couplers. A large variety of ballasting groups are well known in the coupler art. Y, in Formula I, is a coupling off group, such as, the chlorine atom, the fluorine atom, the thiocyano group, an acyloxy group [e.g., an alkoyloxy group (substituted or not), an aroyloxy group (substituted or not), heterocycloyloxy group (substituted or not), etc., in which the acyloxy groups are substituted with a wide variety of well-known groups and also a $$R-\overset{O}{\overset{\|}{C}}-\overset{X}{\overset{|}{C}}HO-$$

group in which R and X are as described previously], and a cyclooxy group [e.g., an aryloxy group (e.g., a phenoxy group, a naphthoxy group, a heterocycloxy group (e.g., a pyridinyloxy group, a tetrahydropyranyloxy group, a tetrahydroquinolyloxy group, etc.)], an alkoxy group, an alkthio group and an arylthio group in which these groups are advantageously substituted with a wide variety of well-known groups or are substituted with a $$R-\overset{O}{\overset{\|}{C}}-\overset{X}{\overset{|}{C}}H-O-$$

group in which R and X are as defined previously:

Typical preferred couplers included the following:

(1) 4-(α-2′-methoxybenzoyl-α-chloroacetamido)-3″-(4‴-tert-amylphenoxy)benzanilide
(2) α-o-methoxybenzoyl-α-chloro-4-[α-(2,4-di-tert-amylphenoxy)-n-butyramido]-acetanilide (3) α-{3-[α-(2,4-di-tert-amylphenoxy)butyramido]benzoyl}-α-fluoro-2-methoxyacetanilide
(4) α-fluoro-α-pivalyl-5-[γ-(2,4-di-tert-amylphenoxy)butyramido]-2-chloroacetanilide
(5) α-acetoxy-α-{3-[γ-(2,4-di-tert-amylphenoxy)butyramido]benzoyl}-2-methoxyacetanilide
(6) α-benzoyl-α-[α-(2,4-di-n-amylphenoxy)acetoxy]-2-methoxyacetanilide
(7) α-pivalyl-α-stearoyloxy-4-sulfamylacetanilide
(8) α-pivalyl-α-[4-(4-benzyloxyphenylsulfonyl)phenoxy]-2-chloro-5-[γ-2,4-di-tert-amylphenoxy)butyramido] acetanilide
(9) α-acetoxy-α-{3-[α-(2,4-di-tert-amylphenoxy)butyramido]benzoyl}-2-methoxyacetanilide
(10) α-(3-dodecanamidobenzoyl)-α-octanoyloxy-2-methoxyacetanilide
(11) α-{3-[γ-(2,4-di-tert-amylphenoxy)butyramido]benzoyl}-α(4-nitrophenoxy)-2-methoxyacetanilide
(12) α[4-(N-methyl-N-octadecylsulfamyl)phenoxy]-α-pivalyl-4-sulfoacetanilide potassium salt
(13) α-pivalyl-α-(4-sulfophenoxy)-4-(N-methyl-N-octadecylsulfamyl)acetanilide potassium salt
(14) α-[4-(4-hydroxyphenylsulfonyl)phenoxy]-α-pivalyl-2-chloro-5-[γ(2,4-di-tert-amylphenoxy)butyramido] acetanilide
(15) 4,4′-bis[α-pivalyl-α-{2-chloro-5-[γ-(2,4-di-tert-amylphenoxy)butyramido]phenylcarbamyl}methoxy] diphenylsulfone
(16) α-benzoyl-α-thiocyanoacetanilide Other yellow dye-forming couplers that are outside couplers of Formula I are also used to advantage. The following couplers will illustrate these:

(1) α-{3-[α-(m-pentadecylphenoxy)butyramido]benzoyl}-2-chloroacetanilide
(2) α-{3-[α-(2,4-di-tert-amylphenoxy)butyramido]benzoyl}-2-methoxyacetanilide
(3) α-{3-[α-(2,4-di-tert-amylphenoxy)-acetamido]benzoyl}-2-chloroacetanilide
(4) 2-chloro-3′-[4-(2,4-di-tert-amylphenoxy)butyramido]benzoylacetanilide
(5) α-{3-[α-(2,4-di-tert-amylphenoxy)acetamido]benzoyl}-2-methoxyacetanilide
(6) α-pivalyl-2,5-dichloro-4-[N′-(n-octadecyl)-N′-(methyl)sulfamyl]acetanilide Any of the known nondiffusible 5-pyrazolone couplers (preferably aldehyde reactive) are incorporated to advantage in our photographic materials. These couplers include those having the formulas:

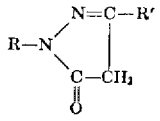

II.

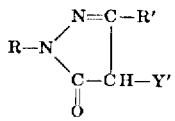

III.

wherein R is as described previously and R′ represents a group such as an alkyl group, a carbamyl group, an amino group, an amido group (e.g., amido, a benzamido group, an alkamido group, etc.), and Y′ represents a coupling off group such as the thiocyano group, an acyloxy group, an aryloxy group, an alkoxy group, an alkylthio group, an arylthio group, the chlorine atom, the fluorine atom, the sulfo group, etc. The R and/or R′ groups are advantageously substituted with any of the well-known substituent groups used in color-forming couplers including ballasting groups to render the couplers nondiffusible in hydrophilic colloid layers, and solubilizing groups.

Typical illustrative examples of the magenta dye-forming couplers include the following:

(1) 1-p-sec.-amylphenyl-3-n-amyl-5-pyrazolone
(2) 2-cyanoacetyl-5-(p-sec.-amylbenzoylamino) coumarone
(3) 2-cyanoacetylcoumarone-5-(N-n-amyl-p-tert-amylsulfanilide)

(4) 2-cyanoacetylcoumarone-5-sulfon-N-n-butylanilide
(5) 2-cyanoacetyl-5-benzoylamino-coumarone
(6) 2-cyanoacetylcoumarone-5-sulfondimethylamide
(7) 2-cyanoacetylcoumarone-5-sulfon-N-methylanilide
(8) 2-cyanoacetylcoumarone-5-(N-γ-phenylpropyl(-p-tert-amylsulfonanilide
(9) 1-p-laurylphenyl-3-methyl-5-pyrazolone
(10) 1-β-naphthyl-3-amyl-5-pyrazolone
(11) 1-p-nitrophenyl-3-n-amyl-5-pyrazolone
(12) 1-p-phenoxyphenyl-3-n-amyl-5-pyrazolone
(13) 1-phenyl-3-n-amyl-5-pyrazolone
(14) 1,4-phenylene bis-3-(1-phenyl-5-pyrazolone)
(15) 1-phenyl-3-acetylamino-5-pyrazolone
(16) 1-phenyl-3-n-valerylamino-5-pyrazolone
(17) 1-phenyl-3-chloroacetylamino-5-pyrazolone
(18) 1-phenyl-3-benzoylamino-5-pyrazolone
(19) 1-phenyl-3-(m-aminobenzoyl)amino-5-pyrazolone
(20) 1-phenyl-3-(p-sec.-amylbenzoylamino)-5-pyrazolone
(21) 1-phenyl-3-diamylbenzoylamino-5-pyrazolone
(22) 1-phenyl-3-β-naphthoylamino-5-pyrazolone
(23) 1-phenyl-3-phenylcarbamylamino-5-pyrazolone
(24) 1-phenyl-3-palmitylamino-5-pyrazolone
(25) 1-phenyl-3-benzenesulfonylamino-5-pyrazolone
(26) 1-(p-phenoxyphenyl)-3-(p-tert-amyloxybenzoyl) amino-5-pyrazolone
(27) 1-(2',4',6'-trichlorophenyl)-3-benzamido-5-pyrazolone
(28) 1-(2',4',6'-tribromophenyl)-3-phenylacetamido-5-pyrazolone
(29) 1-(2',4'-dichlorophenyl)-3-[3''-(2''',4'''-di-tert-amylphenoxyaectamido)benzamido]-5-pyrazolone
(30) 1-(2',4',6'-trichlorophenyl)-3-[3''-(2''',4'''-di-tert-amylphenoxyacetamido)benzamido]-5-pyrazolone
(31) 1-(2,4-dimethyl-6-chlorophenyl)-3-[3-{α-(m-pentadecylphenoxy)butyramido}-benzamido]-5-pyrazolone
(32) 1-(2',5'-dichloro)-3-[3''-(4'''-tert-amylphenoxy) benzamido]-5-pyrazolone
(33) 1-(2',4',6'-tribromophenyl)-3-[3''-(4'''-tert-amylphenoxy)-benzamido]-5-pyrazolone
(34) 1-(2',5'-dichlorophenyl)-3-[3''-(2''',4'''-di-tert-amylphenoxyacetamido)benzamido]-5-pyrazolone
(35) 1-(2,4,6-trichlorophenyl)-3-(4-nitroanilino)-4-stearoyloxy-5-pyrazolone
(36) 1-(2,4,6-trichlorophenyl)-3-{3-[α-(2,4-di-tert-amylphenoxy)-acetamido]benzamido}-4-acetoxy-5-pyrazolone
(37) 1-(2,4,6-trichlorophenyl)-3-pentadecyl-4-thiocyano-5-pyrazolone
(38) 1-(2,4,6-trichlorophenyl)-3-[3-(2,4-di-tert-amylphenoxyacetamido)benzamido]-4-thiocyano-5-pyrazolone
(39) 1-(p-tert-butylphenoxyphenyl)-3-α-(p-tert-butylphenoxy)-propionamido-4-thiocyano-5-pyrazolone
(40) 1-(2,4,6-trichlorophenyl)-3-pentadecyl-4-sulfo-5-pyrazolone
(41) 1-(2,4,6-trichlorophenyl)-3-pentadecyl-4-chloro-5-pyrazolone
(42) 1-[4-(3,5-dicarboxylbenzamido)phenyl]-3-ethoxy-4-(3-octadecylcarbamylphenylthio)-5-pyrazolone Any of the well-known nondiffusible phenolic and naphtholic cyan dye-forming couplers are used to advantage in our photographic materials. The cyan dye-forming couplers used to advantage in our invention include those having the formulas:

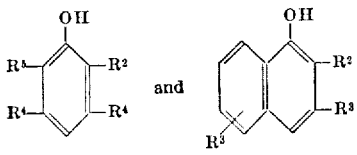

IV. V.

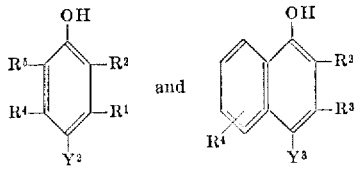

VI. VII.

wherein $R^2$ represents hydrogen, an alkyl group, an aryl group, a heterocyclic group, an amino group (e.g., amino, alkylamino, arylamino, heterocyclic amino, etc.), a substituted carbonamido group (e.g. an alkylcarbonamido group, an arylcarbonamido group, and a heterocyclicarbonamido group), a substituted sulfonamido group (e.g., an alkylsulfonamido group, an arylsulfonamido group, a heterocyclicsulfonamido group, etc.), a substituted sulfamyl group (e.g., an alkylsulfamyl group, an arylsulfamyl group, a heterocyclic sulfamyl group, etc.), a substituted carbamyl group (e.g., an alkylcarbamyl group, an arylcarbamyl group, a heterocyclic carbamyl group, etc.), etc.: $R^3$, $R^4$, $R^5$ each represent any of the groups represented by $R^2$ and in addition the chlorine atom, an alkoxy group, etc.; $R^2$, $R^3$, $R^4$, and $R^5$ are advantageously further substituted by any of the ballasting groups well known in the art; $Y^2$ represents the groups previously defined for Y but does not represent an aryloxy group; $Y^3$ represents the groups previously defined for $Y^2$ and also includes a cyclic imido group (e.g., a maleimido group, a succinimido group, a 1,2-dicarboxyimido group, a phthalimido group, etc.).

Typical examples illustrating these cyan-forming couplers include the following:

(1) 5-(p-amylphenoxybenzenesulfonamino)-1-naphthol
(2) 5-(N-benzyl-N-naphthalenesulfonamino)-1-naphthol
(3) 5-(n-benzyl-N-n-valerylamino)-1-naphthol
(4) 5-caproylamino-1-naphthol
(5) 2-chloro-5-(N-n-valeryl-N-p-isopropylbenzylamino)-1-naphthol
(6) 2-chloro-5-(p-nitrobenzoyl-β-o-hydroxyethylamino)-1-naphthol
(7) 2-chloro-5-palmithylamino-1-naphthol
(8) 2,2'-dihydroxy-5,5'-dibromostilbene
(9) 5-diphenylethersulfonamido-1-naphthol
(10) 1-hydroxy-2-(N-isoamyl-N-phenyl)naphthamide
(11) 1-hydroxy-2-(N-sec.-amylphenyl)naphthamide
(12) 8-hydroxy-1-α-naphthoyl-1,2,3,4-tetrahydroquinoline
(13) 1-naphthol-2-carboxylic-α-naphthalide
(14) 1-naphthol-5-sulfo-cyclohexylamide
(15) 5-phenoxyacetamino-1-naphthol
(16) 5-β-phenylpropionylamino-1-naphthol
(17) monochlor-5-(N-γ-phenylpropyl-N-p-sec.-amylbenzoylamino)-1-naphthol
(18) 2-acetylamino-5-methylphenol
(19) 2-benzoylamino-3,5-dimethylphenol
(20) 2-α-(p-tert-amylphenoxy)-n-butyrylamino-5-methylphenol
(21) 1-hydroxy-2-[σ-(2,4-di-tert-amylphenoxy-n-butyl] naphthamide
(22) 2-(4''-tert-amyl-3'-phenoxybenzoylamino)-3,5-dimethyl-1-phenol
(23) 2(4'-phenoxybenzoylamino)phenol
(24) 2(4''-tert-amyl-3'-phenoxybenzoylamino)phenol
(25) 2-[α-(4'-tert-butylphenoxy)propionylamino]phen
(26) 2-[N-methyl-N-(4''-tert-amyl-3'-phenoxybenzoylamino)]phenol
(27) 2-(4''-tert-amyl-3'-phenoxybenzoxyamino)-3-methyl-1-phenol
(28) 2-(4''-tert-amyl-3'-phenoxybenzoxylamino)-6-methyl-1-phenol
(29) 2-(4''-tert-amyl-3'-phenoxybenzoylamino)-3,6-dimethylphenol

(30) 2,6-di(4''-tert-amyl-3'-phenoxybenzoylamino)-1-phenol
(31) 2-α-(4'-tert-amylphenoxy)butylamino-1-phenol
(32) 2(4''-tert-amyl-3'-phenoxybenzoylamino)-3,5-dimethyl-1-phenol
(33) 2-[α-(4'-tert-amylphenoxy)-n-butyrylamino]-5-methyl-1-phenol
(34) 2(4''-tert-amyl-3'-phenoxybenzoylamino)-4-chloro-1-phenol
(35) 3-[α-(4'-tert-amylphenoxy)n-butyrylamino]-6-chlorophenol
(36) 3-(4''-tert-amyl-3'-phenoxybenzoylamino)phenol
(37) 2[α-(2,5-di-tert-amylphenoxy)butyramido]-4,6-dichloro-5-methylphenol
(38) 3-[α-(4'-tert-amylphenoxy)-n-butyrylamino]-5-chlorophenol
(39) 3-[α-(4'-tert-amylphenoxy)-n-butyrylamino]-2-chlorophenol
(40) 2-α(4'-tert-amylphenoxybutyrylamino)-5-chlorophenol
(41) 2-(4''-tert-amyl-3'-phenoxybenzoxylamino)-3-chlorophenol
(42) 5-benzene sulfonamido-1-naphthol
(43) 2-chloro-5-benzenesulfonamino-1-naphthol
(44) 2-chloro-5-(p-toluenesulfonamino)-1-naphthol
(45) 5-(1,2,3,4-tetrahydronaphthalene-6-sulfamino)-1-naphthol
(46) 2-chloro-5-(4'-bromodiphenyl-4-sulfonamino)-1-naphthol
(47) 5-(quinoline-5-sulfamino)-1-naphthol
(48) 1-hydroxy-4-stearoyloxy-2-naphtholic acid
(49) 1-hydroxy-4-acetoxy-N-[δ-(2,4-tert-amylphenoxy)butyl]-2-naphthalamide
(50) 1-hydroxy-1-acetoxy-N-octadecyl-3',5'-dicarboxy-2-naphthanilide
(51) 1-hydroxy-4-thiocyano-N-[α-2,4-di-tert-amylphenoxy)butyl]-2-naphthamide
(52) 1-hydroxy-4-(pentafluorophenoxy)-N-{β-{4-[α-(2,4-di-tert-amylphenoxy)acetamido]phenyl}ethyl}2-naphthamide
(53) 1-hydroxy-4-(4-nitrophenoxy)-N-[δ-2,4-di-tert-amylphenoxy)butyl]-2-naphthamide
(54) 1-hydroxy-4-(4-chlorophenoxy)-2'-tetradecycloxy-2-naphthanilide
(55) 1-hydroxy-4-phthalimido-N-[δ(2,4-di-tert-amylphenoxy)butyl]-2-naphthamide
(56) 1-hydroxy-4-(dodecenylsuccinimido)-N-[δ(2,4-di-tert-amylphenoxy) butyl]-2-naphthamide
(57) 2-α-(p-tert-amylphenoxy)-n-butyrylamino-4-chloro-5-methylphenol
(58) 1-hydroxy-4-phenylthio-N-[δ-(2,4-di-tert-amylphenoxybutyl]-2-naphthamide
(59) 1-hydroxy-3',5'-dicarboxymethoxy-4-dodecycloxy-2-naphthanilido The couplers used in our photographic elements are advantageously dispersed in the hydrophilic colloid by any of the technics well known in the art. For example, they are advantageously dispersed in high-boiling crystalloidal compounds by methods well known in the art such as are described in Jelley and Vittum U.S. Pat. 2,322,027, the couplers are advantageously dispersed in low solvent dispersions such as are described in Fierke U.S. Pat. 2,801,171, or the couplers are advantageously dispersed in natural resin-type solvents as described in Martinez U.S. Pat. 2,284,879, or the couplers are dissolved in a monomeric solution which is then polymerized in the presence of gelatin to produce dispersions of the coupler in the polymer as described in U.S. Pat. 2,825,382. Fischer-type couplers are advantageously added to the hydrophalic colloid solution.

As mentioned before, the hydrophilic colloids used in our photographic elements are advantageously hardened by [aziridine hardeners, isoxazolium salt hardeners, epoxide hardeners, and] vinyl sulfone hardeners. [The arizidin hardeners used to advantage include 1,3-bis(1-aziridinylsulfonyl) - propane, 1 - (1 - aziridinylcarbonyl) - 3 - (1-aziridinylsulfonyl) - benzene and others described in Burness U.S. Pat. 2,964,404, issued Dec. 13, 1960; N,N'-trimethylene bis(1 - aziridine-carboxamide), N,N' - octamethylene bis(aziridine - carboxamide), toluene-2,4-bis-(1-aziridine-carboxamide), N,N' - tetramethylene bis(1-aziridine-carboxamide) and others described in Allen and Webster U.S. Pat. 2,950,197, issued Aug. 23, 1960; and the aziridinyl azine hardener compounds prepared by reacting cyanine chloride with ethylene imine as described by Yudelson U.S. Pat. 3,017,280, issued Jan. 16, 1962. The oxazolium hardeners used to advantage include 2,5-dimethylisoxazolium perchloroate, 2 - ethyl - 5 - phenylisoxazolium - 3' - sulfonate, 2 - methyl - 5 - p - tolylisoxazolium - 3' - sulfonate and others described in Van Campen and Graham U.S. Pat. 3,316,095, issued Apr. 25, 1967, 2-methylisoxazolium - p - toluenesulfonate, 3-(2 - isoxazolium)propanesulfonate, 2,5 - dimethylisoxazolium p - toluenesulfonate, 2 - methyl - 5 - phenylisoxazolium perchlorate, 4 - (3 - hydroxypropyl) - 2 - methylisoxazolium p - toluenesulfonate, 5 - isopropyl - 2 - methylisoxazolium perchlorate, 2,4 - dimethylisoxazolium p-toluenesulfonate, 3 - [2 - (5 - methylisoxazolium)]propanesulfonate described by Burness and Wilson U.S. Pat. 3,321,313, issued May 23, 1967.] The vinylsulfones used to advantage as hardeners for hydrophilic colloids in our photographic elements include hardening compounds having two vinylsulfonylalkyl groups linked to a single linking heteroatom (e.g., nitrogen atom, or oxygen atom) or radical, including hardeners such as, bis(4-vinylsulfonylbutyl)ether, bis(2 - vinylsulfonylethyl)ether, bis(vinylsulfonylmethyl)ether, N,N - bis(2 - vinylsulfonylethyl)-n - propylamine, N,N - bis(2 - vinylsulfonylethyl) - N-ethyl - N - propylammonium tetrafluoroborate, and bis(1-vinylsulfonylethyl)ether, etc., and other compounds of the formula:

(VIII)

$$\left[CH_2-CHSO\left(\begin{matrix}R^6\\ |\\ CH\end{matrix}\right)_m\right]_2 Z$$

in which m is an integer of from 4, Z is a heteroatom (e.g., nitrogen or oxygen and $R^6$ is hydrogen, or lower alkyl groups (e.g., methyl, ethyl, isopropyl, etc., which can in turn be further substituted), and hardening compounds having two or more vinylsulfonylalkyl groups (i.e., lower alkyl from 1 to 4 carbon atoms) attached to a plurality of tertiary or quaternary nitrogen atoms and/or a plurality of ether oxygen atoms including typical compounds, such as:

(1) N,N-bis(2-vinylsulfonylethyl)piperazine
(2) N,N'-bis(2-vinylsulfonylethyl)piperazine-bis(metho-perchlorate)
(3) N,N'-bis(2-vinylsulfonylethyl)-N,N'-dimethyl-2-butene-1,4-diamine bis(metho-p-toluenesulfonate) and the corresponding bis(methofluoborate)
(4) N,N'-bis(2-vinylsulfonylethyl)-N,N'-dimethylethylene bis(metho-p-toluenesulfonate)
(5) 1,2-bis(vinylsulfonylmethoxy)ethane
(6) 1,4-bis(2-vinylsulfonylethoxy)ethane
(7) bis[2-(2-vinylsulfonylethoxy)ethyl]urea
(9) 1,14-bis(vinylsulfonyl)-3,6,9,12-tetraoxatetradecane as are described in Belgian Pat. 686,440, graned Nov. 14, 1966. The disclosures of U.S. Pats. 2,964,404, 2,950,197, 3,017,280, 3,316,095, and 3,321,313 and Belgian Pat. 686,440 mentioned above are incorporated herein by reference.

The following syntheses will illustrate the preparation of compounds having Formula VIII.

BIS(2-VINYLSULFONYLETHYL)ETHER 6-oxa-3,9-dithiaundecane-1,11-diol is prepared by the reaction of two molar proportions of sodium 2-hydroxyethylmercaptide with one molar proportion of bis(2-chloroethyl)ether in methanol, followed by evaporation of the solvent.

The disulfide is oxidized to the disulfone by hydrogen peroxide according to the method of H. S. Schultz et al., J. Org. Chem., 28, 1140 (1963). The resulting diol is converted to 2,2'-bis(2-chloroethylsulfonyl)ethyl ether by adding two molar proportions of thionyl chloride to a refluxing solution of the diol in acetonitrile containing a catalytic amount of N,N-dimethylformamide. When the reaction is complete, removal of the solvent and recrystallization from ethanol-acetone gives a high yield of a colorless chloride having a melting point of 70°–71° C.

Dehydrohalogenation is effected in tetrahydrofuran solution at about 0–5° C. with two molar proportions of triethylamine. After 24 hours, the solvent is removed and the product recrystallized from methanol giving colorless crystals having a melting point of 47.5–48.5° C.

BIS(VINYLSULFONYLMETHYL)ETHER

Following the procedure of bis(2-vinylsulfonylethyl) ether and starting with bis(chloromethyl)ether, the colorless intermediate chloride is prepared having a melting point of 83–84° C. A similar process of dehydrohalogenation as in bis(2-vinylsulfonylethyl)ether and subsequent recrystallization from a methanol-ethanol mixture yields a colorless product with a melting point of 41.5–42.5° C.

BIS(4-VINYLSULFONYLBUTYL)ETHER

Following the procedure of bis(2-vinylsulfonylethyl) ether and starting with bis(4-chlorobutyl)ether, a colorless intermediate chloride is prepared having a melting point of 66–68° C. Dehydrohalogenation, as in bis(2-vinylsulfonylethyl)ether, carbon decolorization in methanol solution and evaporation of the methanol under reduced pressure yields a pale yellow oily product of $n_D^{25}$ 1.5023.

N,N-BIS(2-VINYLSULFONYLETHYL)-N-PROPYLAMINE

The dropwise addition of a tetrahydrofuran solution of n-propylamine to two molar proportions of divinyl sulfone dissolved in tetrahydrofuran at a temperature maintained at 0–10° C., yielded after two hours, stirring at room temperature and evaporation of the solvent at reduced pressure, a pale tan product of $n_D^{25}$ 1.4917.

Other bis vinylsulfones exhibiting good hardening include N,N-bis(2-vinylsulfonylethyl)-N-ethyl - N - propylammonium tetrafluoroborate, and bis(1-vinylsulfonylethyl)ether.

Our photographic elements are advantageously processed by color development followed by a blix bath (with or without an intervening wash), washing and drying. Preferably, the washed photographic elements are given a stabilizer treatment before drying.

Developer solutions used to advantage are aqueous alkaline solutions of primary aromatic amine color developing agents, preferably containing benzyl alcohol. Any of the well-known primary aromatic amino color-forming silver halide developing agents, such as, the phenylene diamines, e.g., diethyl-p-phenylene diamine hydrochloride, monomethyl-p-phenylene diamine hydrochloride, dimethyl-p-phenylene diamine hydrochloride, 2-amino-5-diethylaminotoluene hydrochloride, 2 - amino - 5 - (N-ethyl-N-laurylamino)toluene, N-ethyl-N,N-(β-methanesulfonamidoethyl)-3-methyl - 4 - aminoaniline sulfate, ethyl-N-ethyl - N - (β - methylsulfonamidoethyl)-4-aminoaniline, 4-[N-ethyl-N(β - hydroxyethyl)amino]aniline, etc., the p-aminophenols and their substitution products where the amino group is unsubstituted may be used in the alkaline developer solution. Any of the addenda used in developer solutions are advantageously used in our developers including, for example, alkali metal sulfites, carbonates, bisulfites, bromides, iodides, etc.

Any of the silver halide solvents used in blix solutions are used advantageously in our blix baths including water-soluble thiosulfates (e.g., potassium thiosulfate, sodium thiosulfate, ammonium thiosulfate, etc.), a water-soluble thiocyanate (e.g., sodium thiocyanate, potassium thiocyanate, ammonium thiocyanate, etc.), water-soluble organic diol fixing agents containing sulfur or oxygen atoms, or atoms of both species interspersed along the carbon chain (e.g., 3-thia-1,5-pentanediol, 3,6-dithia-1,8-octanediol, 3,6,9-trithia-1,11-undecanediol, 3,6,9,12 - tetrathia-1,14-tetradecanediol, 9-oxa-3,6,9,12,15-tetrathia-1,17-heptadecanediol, 3,6,9,12,21,30,33,36,39 - nonaoxa-15,18,24,27-tetrathia-1,41-hentetraoctanediol, etc.), a water-soluble sulfur-containing organic dibasic acid, e.g., ethylene bis thioglycolic acid, 3,6,9-trithiahendecanedioic acid, 3,6,9,12-tetrathiatetradecanedioic acid and their water-soluble salts (e.g., sodium salts, potassium salts, etc.), an imidazolidinthione (e.g., methyl imidazolidinthione, ethyl imidazolidinthione, etc.), etc. Any if the silver halide oxidizing agents used in blix solutions are used advantageously in our blix baths including water-soluble ferricyanides (e.g., sodium ferricyanide, potassium ferricyanide, ammonium ferricyanide, etc.), water-soluble quinones (e.g., quinone, sulfophenylquinone, chloroquinone, methoxyquinone, 2,5-dimethoxyquinone, methylquinone, etc.), a simple water-soluble ferric salt (e.g., ferric chloride, ferric nitrate, ferric sulfate, ferric thiocyanate, ferric oxolate, etc.), a simple water-soluble cupric salt (e.g., cupric chloride, cupric nitrate, cupric sulfate, etc.), a simple water-soluble cobaltic salt (e.g., cobaltic chloride, cobaltic ammonium nitrate, etc.) and complex salts of an alkali metal and a polyvalent cation with an organic acid having one of the formulas:

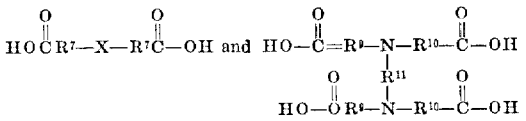

wherein X represents a hydrocarbon residue, oxygen, sulfur on an $=NR^{12}$ group; $R^7$, $R^8$, $R^9$, $R^{10}$ and $R^{11}$ each represent a substituted hydrocarbon residue and an unsubstituted hydrocarbon residue, and $R^{12}$ represents hydrogen, an unsubstituted hydrocarbon residue and a substituted hydrocarbon residue, and wherein the polyvalent cation is selected from the class of ferric ion, cobaltic ion and cupric ions. Typical examples of the organic acids are ethylene diamine tetraacetic acid, nitrilotriacetic acid, malonic acid, ethyl malonic acid, tartaric acid, malic acid, fumaric acid, diglycolic acid, ethyliminodipropionic acid, ethylene dithioglycolic acid, dithioglycolic acid, etc.

Any of the addenda commonly used in blix solutions are used to advantage in our blixes including alkali metal bromide, ammonium bromide, alkali metal iodides, ammonium iodide, hydrazine, hydroxylamine salts, amines, mercapto derivatives of 5-membered heterocyclic rings such as mercaptotriazole, a formamidine sulfinic acid, etc.

Any aqueous acidic stabilizer solution used in color processing is advantageously used in our process including stabilizer solutions containing citric acid.

The following examples are included for a further understanding of our invention.

EXAMPLE 1

Two single layer gelatino silver chlorobromide emulsion coatings, 1 and 2, are made on different pieces of a photographic paper support. Coating 1 contains a dispersion of the yellow dye-forming coupler, α-pivalyl-2-chloro - 5 - [γ-(2,4 - di - tert-amylphenoxy)butyramido] acetanilide in dibutylphthalate at a coupler to coupler solvent ratio of 1:1. Coating 2 contains a dispersion of the yellow dye-forming coupler, α-pivalyl-α-[4-(4-benzyoxyphenylsulfonyl)phenoxy]-2-chloro - 5 - [γ-(2,4 - di - tert-amylphenoxy)butyramido]acetanilide in coupler solvent dibutylphthalate at a coupler to coupler solvent ratio 10:1. A sample of each of the two coatings are sensitometrically exposed to a step wedge, color developed in a conventional color developing solution containing benzyl alcohol, sodium sulfite, the color developing agent N-ethyl-β - methanesulfonamidoethyl - 3 - methyl-4-aminoaniline sulfate and alkali to give a pH of about 10, fixed for 2 minutes at 85° F. in a fixing bath having the composition:

| | | |
|---|---|---|
| Sodium thiosulfate | g | 240 |
| Sodium sulfite | g | 15 |
| Acetic acid, 28% | ml | 48 |
| Boric acid | g | 7.5 |
| Potassium alum | g | 15 |

Water to 1 liter.

rinsed and dried. Processed Coating 1 contains only a barely visible amount of yellow dye whereas the image in Coating 2 is brightly yellow. The lack of visible yellow dye in Coating 1 is due to the generation during color development of a colorless form of yellow dye from the yellow coupler which is outside of our invention. The coupler used in Coating 2 is a coupler of our invention. Another set of samples of each of the two coatings are sensitometrically exposed and color developed as described above and subsequently bleached for 2 minutes at 85° F. in a solution having the composition:

| | G. |
|---|---|
| Sodium bromide | 21.5 |
| Potassium ferricyanide | 100 |
| Sodium phosphate | 7 |

Water to 1 liter.

and fixed for 2 minutes at 85° F. in the fixing bath described above. Both Coatings 1 and 2 which were bleached and fixed subsequent to color development contained excellent yellow dye images. These tests indicate that the colorless form of the yellow dye formed by color development in Coating 1 requires a strong oxidizing treatment (bleach) for its conversion to the visible yellow dye. Coating 2 of our invention, however, contains the yellow dye image at its maximum density after color development and the treatment of this sample in the bleach serves only the purpose of oxidizing the image silver.

EXAMPLE 2

A multilayer photographic element is made comprising a polyethylene coated paper support coated in succession with a blue-sensitive gelatino silver chlorobromide emulsion containing the yellow dye-forming coupler, α-pivalyl-α-[4-(4-benzyloxyphenylsulfonyl)phenoxy] - 2 - chloro-5-[γ-(2,4 - di-tert-amylphenoxy)butyramido]acetanilide in dibutyl phthalate at a coupler to coupler solvent ratio of 10:1, a gel interlayer, a green-sensitized gelatino silver chlorobromide emulsion containing the magenta dye-forming coupler, 1-(2,4-dimethyl - 6 - chlorophenyl)-3-[3-{α - (m-pentadecylphenoxy)butyramido}benzamido]-5-pyrazolone in tricresyl phosphate at a coupler to coupler solvent ratio of 1:1, a gel interlayer, a red-sensitized gelatino layer chlorobromide emulsion containing the cyan dye-forming coupler, 2-[α - (2,5-di-tert-amylphenoxy) butyramido]4,6 - dichloro - 5 - methylphenol in dibutyl phthalate at a coupler to coupler solvent ratio of 2:1, and a gel overcoat. The gelatin used in this photographic element is hardened with formaldehyde. Two samples of this photographic element are sensitometrically exposed and respectively processed as described under A and B.

PROCESS A 5-solution process (bleach and fix), temperature: 85° F.

| | Minutes |
|---|---|
| Color development (developer described in Example 1) | 6 |
| Stop fix | 2 |
| Wash | 2 |
| Bleach (described in Example 1) | 2 |
| Wash | 2 |
| Fix (fix bath described in Example 1) | 2 |
| Wash | 4 |
| Stabilizer | 2 |

PROCESS B 3-solution process (blix), temperature: 85° F.

| | Minutes |
|---|---|
| Development (developer described in Example 1) | 6 |
| Blix | 2 |
| Wash | 4 |
| Stabilizer | 2 |

The blix solution used in Process B has the composition:

| | | |
|---|---|---|
| Sodium ferric ethylenediamine tetraacetic acid | g | 45 |
| Ammonium thiocyanate | g | 10 |
| Sodium sulfite | g | 10 |
| Ammonium thiosulfate (60% aqueous solution) | ml | 100 |
| Ethylenediamine tetraacetic acid, tetrasodium salt | g | 5 |

Water to 1 liter.

pH adjusted to 6.7 to 7.

The stabilizer bath used in Processes A and B is a conventional aqueous citric acid stabilizer having a pH of 3.5. Densitometric readings are made of the yellow, magenta, cyan dye images of the samples processed according to Process A and Process B. Sensitometric curves are plotted from these density data correlating the yellow dye density with the log of the exposure, the magenta dye density with the log of the exposure and the cyan dye density with the log of the exposure. A comparison of these curves shows that:

(1) The density of the yellow image dye in the sample processed with the blix solution in Process B is as high as that of the yellow image dye in the sample processed through a separate bleach and a separate fix, i.e., Process A. This observation confirms that no colorless form of the yellow dye is formed in the blue-sensitive layer when it contains a yellow dye-forming coupler according to our invention.

(2) The density of the magenta dye image in the sample given Process B (blix) is about 20% lower in the shoulder than the density of the magenta image dye in the sample given Process A (separate bleach and separate fix). This illustrates that the colorless form of the magenta dye formed in the green-sensitive layer (outside our invention) is not converted to the magenta dye by the relatively low oxidizing potential of the blix solution.

(3) The cyan dye image is unaffected by either Process A or Process B.

EXAMPLE 3

A multilayer photographic element is made like that described in Example 2 excepting that gelatin used contained no formaldehyde. A sensitometrically exposed sample of this photographic element is blix-processed by Process B described in Example 2. A second sensitometric sample of the same coating is similarly processed except that after the blix bath it is treated in a separate ferricyanide bleach bath having the composition described in Example 1. The magenta dye densities in these two samples are determined and the curves correlating magenta dye density with the log exposure plotted as a graph for each sample. These graphs are essentially the same showing that the green-sensitive layer made according to our invention does not generate any uncolored magenta dye.

EXAMPLE 4

On sensitometrically exposed sample of a multilayer photographic element, similar to that described in Example 2 (i.e., containing formaldehyde as the hardener) was blix processed by Process B described in Example 2. A second sensitometrically exposed sample of the same coating is similarly processed except that after the blix bath, it is treated in a separate bleach of the composition as described in Example 1. The magenta dye densities of the images developed in the two processed samples were determined and plotted as the characteristic curves correlating magenta dye density vs. log exposure. A comparison of the characteristic curves shows that in the presence of formalin, the pyrazolone coupler generates a dye density that is about 27% low at a density of .48 and about 24% low at a density of 1.7 and that a separate bleach bath with an oxidation potential higher than that of the preceding blix bath is required to convert the uncolored form of the magenta dye to visible magenta dye.

EXAMPLE 5

A multilayer photographic element is made having coated over a polyethylene coated support in succession a blue-sensitive gelatino silver chlorobromide emulsion invention, α - pivalyl - 2 - chloro-5-[γ-(2,4-di-tert-amyl-containing the yellow dye-forming coupler, outside our phenoxy)butyramido]acetanilide in dibutyl phthalate at a coupler to coupler solvent ratio 2:1, a gel interlayer, a green-sensitized gelatino silver chlorobromide emulsion containing the magenta dye-forming coupler 1-(2,4-dimethyl - 6 - chlorophenyl) - 3 - [3-{α-(m-pentadecylphenoxy)butyramido}benzamido] - 5 - pyrazolone in tricresyl phosphate at a coupler to coupler solvent ratio of 1:1, a gel interlayer, a red-sensitized gelatino silver chlorobromide emulsion containing the cyan dye-forming coupler, 2 - [α - (2,5-di-tert-amylphenoxy)butyramido]-4,6-dichloro-5-methylphenol in dibutyl phthalate at a coupler to coupler solvent ratio of about 2:1, and a gel overcoat. The gelatin used in making this photographic was hardened with a divinylsulfone. Two samples of the described photographic element are given sensitometric exposures. One of the exposed samples was given Process A (5-solution process with separate bleach and separate fix) described in Example 2, and the other exposed photographic element was given Process B (3-solution process using a blix) described in Example 2. The yellow, magenta and cyan dye densities are determined for the images in each of the processed photographic elements and the corresponding characteristic curves relating dye density vs. log exposure are plotted. A comparison of the sensitometric curves shows that:

(1) A good yellow dye image is produced in the sample given Process A, however, the yellow dye density in the sample given Process B is unacceptably low showing that the blix bath having a lower oxidizer potential than a bleach bath is unable to convert the uncolored form of the yellow dye produced from the coupler outside our invention.

(2) The density of the magenta dye image in the sample given Process A. This observation indicates that the divinylsulfone hardening agent used according to this invention does not react with the 5-pyrazolone coupler to form an uncolored form of the magenta dye upon color development.

EXAMPLE 6

Two samples of multilayer photographic element similar to that illustrated in Example 5 but wherein the first layer coated over the paper support has the following composition: a blue-sensitive gelatino silver chlorobromide emulsion containing the yellow coupler, α-pivalyl-α - 14 - (4 - benzoyloxyphenylsulfonyl)phenoxy] - 2-chloro - 5 - [γ - (2,4-di-tert-amylphenoxy)butyramido] acetanilide in dibutyl phthalate at a coupler to coupler solvent ratio of 10:1 are sensitometrically exposed and processed by the procedure described in Example 2 but leaving out the stabilizing step. The characteristic curves of the dye images are plotted from density reading made of the images in the processed photographic elements. A comparison of the graphs made shows that the characteristic curves of the yellow and magenta dye images in both coatings are alike and at their maximum densities. Thus the use of one of our yellow couplers and hardening agents in our multicolor element according to our invention prevents the formation of uncolored yellow dye in the blue-sensitive layer and prevents the formation of uncolored magenta dye in the green-sensitized layer of the color photographic element of our invention. The absence of the uncolored dyes in our photographic elements makes it unnecessary to treat the color developed photographic element in either separate bleach and separate fix solutions or in an additional bleach solution subsequently to the blix. Our photographic elements, thus, make it possible to get the desired magenta and yellow dye densities by using only a two-step process that is color development followed by a blix while color elements outside of our invention require a four-step process comprising color development, stop fix, bleach, and fixing with two intervening washes in order to get the desired yellow and magenta dye densities. A stabilizer step is used advantageously in the preferred process to improve the stability of the developed dye images over relatively long periods of time. Similar results are obtained with our photographic elements when they are given Process B of our invention but with a water wash in between the color development step and the blix step.

EXAMPLE 7

Example 6 is repeated using gelatin hardened with other vinylsulfones having two vinylsulfonyl alkyl groups linked to a single linking heteroatom such as, bis(4-vinylsulfonylbutyl)ether,
bis-(2-vinylsulfonylmethyl)ether,
N,N-bis(2-vinylsulfonylethyl)-n-propylamine,
N,N-bis(2-vinylsulfonylethyl)-N-ethyl-N-propylammonium tetrafluoroborate, and
bis(1-vinylsulfonylethyl)ether, etc.

All of these photographic elements gives results similar to those described in Example 6 when processed through a color developer solution followed by our blix solution either directly or following an intervening water wash.

EXAMPLE 8

Example 6 is repeated using gelatin hardened with hardening agents, such as,

N,N-bis(2-vinylsulfonylethyl)piperazine,
N,N'-bis(2-vinylsulfonylethyl)piperazine-bis(metho-perchlorate),
N,N'-bis(2-vinylsulfonylethyl)-N,N'-dimethyl-2-butene-1,4-diamine bis(metho-p-toluenesulfonate)

and the corresponding bis(methofluorborate),
N,N'-bis(2-vinylsulfonylethyl)-N,N'-dimethylethylene bis(metho-p-toluenesulfonate),
1,2-bis(vinylsulfonylmethoxy)ethane,
1,4-bis(2-vinylsulfonylethoxy)ether,
bis[2-(2-vinylsulfonylethoxy)ethyl]sulfone,
N,N'-bis[2-(2-vinylsulfonylethoxy)ethyl]urea,
1,14-bis(vinylsulfonyl)-3,6,9,12-tetraoxatetradecane, etc.

All of these photographic elements give results similar to those described in Example 6 when processed through a color developer solution followed by our blix solution either directly or following an intervening water wash.

EXAMPLE 9

Example 6 is repeated using gelatin hardened with aziridine hardeners, such as, 1,3-bis(1-aziridinylsulfonyl)propane,
1-(1-aziridinylcarbonyl)-3-(1-aziridinylsulfonyl)benzene,
N,N'-trimethylene bis(1-aziridine-carboxamide),
N,N'-octamethylene bis(1-aziridine-carboxamide),
toluene-2,4-bis(1-aziridine-carboxamide),
N,N'-tetramethylene bis(1-aziridine-carboxamide), etc.

and the oxazolium hardeners, such as, 2,5-dimethylisoxazolium perchlorate,
2-ethyl-5-phenylisoxazolium-3'-sulfonate,
2-methyl-5-p-tolylisoxazolium-3'-sulfonate, 2,5-dimethylisoxazolium p-toluenesulfonate,
3-(2-isoxazolium)propanesulfonate,
2,5-dimethylisoxazolium-p-toluenesulfonate,
2-methyl-5-phenylisoxazolium perchlorate,
4-(3-hydroxypropyl)-2-methylisoxazolium p-toluenesulfonate,
5-isopropyl-2-methylisoxazolium perchlorate,
2,4-dimethylisoxazolium p-toluenesulfonate,
3-[2-(5-methylisoxazolium)]propanesulfonate, etc.

All of these photographic elements give results similar to those described in Example 6 when processed through a color developer solution followed by our blix solution either directly or following an intervening water wash.

EXAMPLE 10

Example 6 is repeated using in our photographic element as the yellow dye-forming coupler, the magenta dye-forming coupling and the cyan dye-forming coupler, the respective couplers listed below:

Yellow dye-forming couplers (1) α-o-methoxybenzoyl-α-chloro-4-[α(2,4-di-tert-amylphenoxy)-n-butyramido]acetanilide
(2) α-fluoro-α-pivalyl-5-[γ-(2,4-di-tert-amylphenoxyl) butyramido]-2-chloroacetanilide
(3) α-acetoxy-α-{3-[γ-(2,4-di-tert-amylphenoxy)butyramido]benzoyl}-2-methoxyacetanilide
(4) α-pivalyl-α-stearoyloxy-4-sulfamylacetanilide
(5) α-pivalyl-α-[4-(4-benzyloxyphenylsulfonyl)phenoxy]-2-chloro-5-[γ-(2,4-di-tert-amylphenoxy)butyramido]acetanilide
(6) α-{3-[α-(m-pentadecylphenoxy)butyramido]benzoyl}-2-chloroacetanilide
(7) α-{3-[α-(2,4-di-tert-amylphenoxy)butyramido]benzoyl}-2-methoxyacetanilide
(8) α-{3-[α-(2,4-di-tert-amylphenoxy)acetamido]benzoyl}-2-methoxyacetanilide
(9) α-pivalyl-2,5-dichloro-4-[N'-(n-octadecyl)-N'-(methyl)sulfamyl]acetanilide

Magenta dye-forming couplers (1) 1-(2',4'-dichlorophenyl)-3-[3''-(2''',4'''-di-tert-amylphenoxyacetamido)benzamido]-5-pyrazolone
(2) 1-(2,4-dimethyl-6-chlorophenyl)-3-[3-{α-m-pentadecylphenoxyl)butyramido}-benzamido]-5-pyrazolone
(3) 1-(2,4,6-trichlorophenyl)-3-(4-nitroanilino)-4-stearoyloxy-5-pyrazolone
(4) 1-(2,4,6-trichlorophenyl)-3-{3-[α-(2,4-di-tert-amylphenoxy)acetamido]benzamindo}-4-acetoxy-5-pyrazolone
(5) 1-(2,4,6-trichlorophenyl)-3-[3-(2,4-di-tert-amylphenoxyacetamido)benzamido]-4-thiocyano-5-pyrazolone

Cyan dye-forming couplers (1) 2-[α-(4'-tert-butylphenoxy)propionylamino]phenol
(2) 2-(4''-tert-amyl-3'-phenoxybenzoylamino)-3,6-dimethylphenol
(3) 2-[α-(2,5-di-tert-amylphenoxy)butyramido]-4,6,-dichloro-5-methylphenol
(4) 1-hydroxy-4-(4-chlorophenoxy)-2'-tetradecyloxy-2-naphthanilide Similar results to those obtained in Example 6 are produced when these photographic elements are color developed and blixed as described in Example 6.

EXAMPLE 11

Example 6 is repeated but using a blix in which 45 grams of sodium cobaltic ethylenediamine tetraacetic acid is used in place of sodium feric ethylenediamine tetraacetic acid. Results are obtained that are similar to those obtained in Example 6.

EXAMPLE 12

Example 6 is repeated but using a blix solution in which an equivalent amount of sodium cupric ethylenediamine tetraacetic acid is substituted for sodium ferric ethylenediamine tetraacetic acid. Results obtained are similar to those given by Example 6.

EXAMPLE 13

Example 6 is repeated but using a blix in which sodium feric ethylenediamine tetraacetic acid is replaced with an equivalent amount of sodium cupric nitrilo triacetic acid and the ethylenediamine tetraacetic acid tetrasodium salt is substituted by an equivalent amount of nitrilo triacetic acid trisodium salt. Results are obtained that are similar to those from Example 6.

EXAMPLE 14

Example 6 is repeated using in place of the blix solution used in Example 6 a blix having the following composition:

| | G. |
|---|---|
| Sulfuric acid, concentrated | 7.5 |
| Ferric chloride ($6H_2O$) | 12 |
| Ethylenediamine tetraacetic acid, trisodium salt | 55 |
| Sodium sulfite (desiccated) | 50 |
| Ammonium thiocyanate | 10 |
| 3,6-dithia-1,8-octanediol | 10 |
| Water to 1 liter. | |

pH is adjusted to 5.5.

This example gives results similar to those described in Example 6.

EXAMPLE 15

Example 6 is repeated using in place of the blix solution used in Example 6 a blix having the following composition:

| | G. |
|---|---|
| Potassium ferricyanide | 35 |
| 3,6-dithia-1,8-octanediol | 25 |
| Ammonium thiocyanate | 25 |
| Water to 1 liter. | |

A short water wash is used between the color developing solution and this blix to give results that are similar to those obtained in Example 6.

EXAMPLE 16

Example 6 is repeated using in place of the blix solution used in Example 6 a blix adjusted to pH of 8 (prepared just prior to use), comprising:

| | G. |
|---|---|
| Potassium ferricyanide | 50 |
| Sodium thiosulfate | 200 |
| Water to 1 liter. | |

This example gives results similar to those described in Example 6.

EXAMPLE 17

Example 6 is repeated using in place of the blix solution used in Example 6 a blix adjusted to a pH of 7, comprising:

| | G. |
|---|---|
| Sodium thiosulfate | 150 |
| Cobaltic ammonium carbonate nitrate | 30 |
| Water to 1 liter. | |

This example gives results similar to those described in Example 6.

EXAMPLE 18

Example 15 is repeated using in place of the blix solution used in Example 15 a blix adjusted to a pH of about 1.5, comprising:

| | G. |
|---|---|
| 3,6-dithia-1,8-octanediol | 50 |
| Quinone | 4 |
| Water to 1 liter. | |

This example gives results similar to those described in Example 6.

Similarly it can be shown that still other developing-out, multicolor photographic elements made according to our invention are advantageously processed using other color developer solutions of our invention, and other blix solutions of our invention to produce good magenta and yellow dye densities without the need for a bleach solution following the blix. Although the above examples describe the use of our photographic elements and process for negative-positive work, it is understood that our photographic elements and process are advantageously used in direct reversal work. For this purpose our exposed photographic elements are advantageously given a nucleating step prior to the development step which is followed by the blix step, washing and stabilization.

The typical water-soluble organic diol fixing agents mentioned previously in the specification are prepared as described below.

3,6-dithia-1,8-octanediol is prepared as follows: To a cold solution of 46 g. of sodium in one liter of methanol is added 150 g. of 2-mercapto methanol. To the cooled reaction mixture there is added with stirring 99 g. of 1,2-dichloroethane. After the reaction mixture is allowed to remain at room temperature overnight. 500 ml. of methanol is removed at reduced pressure. The residue is mixed with 500 ml. of water and the whole extracted with chloroform. The chloroform extract is dried over anhydrous magnesium sulfate, filtered and the chloroform removed at reduced pressure leaving the product.

3,6,9-trithia-1,11-undecanediol is prepared to advantage by reacting one mole of bis(2-chloroethyl)sulfide with 2 moles of 2-hydroxyethanediol sodium salt in ethanol. Isolation and purification of the product are accomplished by methods well known in the art. The bis(2-chloroethyl)sulfide is advantageously made by treating one mole of 3 - thia - 1,5 - pentadiol (available commercially) with 2 moles of thionyl chloride in a suitable inert anhydrous organic solvent.

3,6,9,12-tetrathia-1,14-tetradecanediol is prepared to advantage by reacting one mole of 1,2-dichloro-3,6-dithiaoctane with 2 moles of 2-hydroxyethanoldiol sodium salt in ethanol. Isolation and purification of the product are accomplished by methods well known in the art. The 1,8-dichloro-3,6-dithiaoctane is advantageously prepared by treating one mole of 3,6 - dithia - 1,8 - octanediol with 2 moles of thionyl chloride in a suitable inert anhydrous organic solvent.

9-oxa-3,6,9,12,15-tetrathia-1,17-heptadecanediol is advantageously prepared by reacting one mole of 1,11-dichloro-3,9-dithia-6-oxaundecane with 2 moles of 2-hydroxyethandiol sodium salt in methanol. Isolation and purification of the product are accomplished by methods well known in the art. The 1,11-dichloro-3,9-dithia-6-oxaundecane is prepared advantageously by reacting one mole of bis(2-chloroethyl)ether (available commercially) with 2 moles of 2-hydroxyethanethiosodium salt to form one mole of 3,9-dithia-6-oxa-1,11-undecanediol which is treated with 2 moles of thionyl chloride in a suitable inert anhydrous organic solvent.

3,6,9,12,21,30,33,36,39 - nonaoxa - 15,18,24,27-tetrathia-1,41-hentetradecanediol is advantageously prepared by reacting 9 - oxa - 3,6,12,15-tetrathia-1,17-heptanediol described previously with 2 moles of ethylene oxide and subsequently reacting one molar equivalent of the compound formed with 6 molar equivalents of ethylene oxide in a suitable inert anhydrous organic solvent.

The invention has been described in detail with particular embodiments thereof, but it will be understood that variations and modifications can be effected within the spirit and scope of the invention as described hereinabove and as defined in the appended claims.

We claim:

1. A color process for a latent image-exposed light-sensitive color photographic element comprising a support having coated thereon hydrophilic colloid containing a first silver halide emulsion sensitive to one region of the visible spectrum and contiguous to said first silver halide emulsion a nondiffusible *alkyl* ketomethylene open-chain yellow dye-forming coupler that reacts with oxidized primary aromatic amine color developing agent to form a yellow dye and substantially no residual uncolored form of said yellow dye, and a second silver halide emulsion sensitive to a second region of the visible spectrum and contiguous to said second silver halide emulsion a non-diffusible 5-pyrazolone which reacts with oxidized primary aromatic amine color developing agent to form a magneta dye, said photographic element being *hardened with a divinylsulfone hardening agent* [substantially free of aldehyde hardening agents] and substantially free of *aldehyde and* aldehyde-releasing hardening agents, said process comprising the steps:

(1) color developing the said latent image exposed photographic element by contacting it with an alkaline solution in the presence of a primary aromatic amine color developing agent to convert the said latent image in the said first silver halide emulsion into the corresponding silver image and yellow dye image with substantially no residual uncolored form of said yellow dye, and to convert the said latent image in the said second silver halide emulsion into the corresponding silver and magneta dye image with substantially no uncolored form of the said magenta dye, and (2) blixing the said color developed photographic element by contacting it with an aqueous blix solution containing a silver halide solvent and an oxidizing agent for silver to convert the silver and silver halide in the photographic element into water-soluble compounds, to remove the said water-soluble compounds from the photographic element and to leave the said yellow dye image and said magneta dye image.

2. A color process for a latent image-exposed light-sensitive color photographic element comprising a support having coated thereon hydrophilic colloid containing a first silver halide emulsion sensitive to one region of the visible spectrum and contiguous to said first silver halide emulsion a non-diffusible *alkyl* ketomethylene open-chain yellow dye-forming coupler that reacts with oxidized primary aromatic amine color developing agent to form a yellow dye and substantially no residual uncolored form of said yellow dye, a second silver halide emulsion sensitive to a second region of the visible spectrum and contiguous to said second silver halide emulsion a nondiffusible 5-pyrazolone which reacts with oxidized primary aromatic amine color developing agent to form a magenta dye, and a third silver halide emulsion sensitive to a third region of the visible spectrum and contiguous to the said third silver halide emulsion a nondiffusible coupler which reacts with oxidized primary aromatic amine color developing agent to form a cyan dye, said photographic element being *hardened with a divinylsulfone hardening agent* [substantially free of aldehyde hardening agents] and substantially free of aldehyde *and aldehyde* releasing hardening agents, said process comprising the steps:

(1) color developing the said latent image exposed photographic element by contacting it with an alkaline solution of a primary aromatic amine color developing agent to convert the said latent image in the said first silver halide emulsion into the corresponding silver image and yellow dye image with substantially no residual uncolored form of said yellow dye, to convert the said latent image in the said second silver halide emulsion into the corresponding silver and magenta dye images with substantially no uncolored form of the said magenta dye, and to convert the said latent image in the said third silver halide emulsion into the corresponding silver and cyan dye image, and (2) blixing the said color developed photographic element by contacting it with an aqueous blix solution containing a silver halide solvent and an oxidizing agent for silver to convert the silver and silver halide in the photographic element into water-soluble compounds, to remove the said water-soluble compounds from the photographic element and to leave the said yellow dye image, the said magenta dye image and the said cyan dye image.

3. A process of claim 2 in which the silver halide solvent in the blix solution is selected from the class consisting of a water-soluble thiosulfate, a water-soluble thiocyanate, a water-soluble organic diol fixing agent, a water-soluble sulfur-containing dibasic acid, a water-soluble salt of a sulfur-containing organic dibasic acid, and an imidazolidinthione and in which the oxdizing agent for silver is selected from the class consisting of a water-soluble ferricyanide, a water-soluble quinone, a simple water-soluble ferric salt, a simple water-soluble cupric salt, a simple water-soluble cobaltic salt and complex salts of an alkali metal and polyvalent cation with an organic acid having one of the formulas:

and

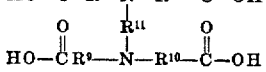

wherein X represents a member selected from the class consisting of a hydrocarbon residue, oxygen, sulfur and an $=NR^{12}$ group; $R^7$, $R^8$, $R^9$, $R^{10}$ and $R^{11}$ each represent a hydrocarbon residue and $R^{12}$ represents a member selected from the class consisting of hydrogen and a hydrocarbon residue, and wherein the polyvalent cation is selected from the class consisting of ferric ion, cobaltic ion and cupric ions.

4. A process of claim 2 in which the silver halide solvent in the blix solution is selected from the class consisting of a water-soluble thiosulfate, a water-soluble thiocyanate, a water-soluble organic diol fixing agent, a water-soluble sulfur-containing dibasic acid, a water-soluble salt of a sulfur-containing organic dibasic acid, and an imidazolidinthione and in which the oxdizing agent for silver is selected from the class consisting of a water-soluble ferricyanide, a water-soluble quinone, a simple water-soluble ferric salt, a simple water-soluble cupric salt, a simple water-soluble cobaltic salt and complex salts of an alkali metal and polyvalent cation with an organic acid selected from the class consisting of ethylene diamine tetraacetic acid, nitrilotriacetic acid, malonic acid, ethyl malonic acid, tartaric acid, malic acid, fumaric acid, diglycolic acid, ethyliminodipropionic acid, ethylene dithioglycolic acid, and dithioglycolic acid, and wherein the said polyvalent cation is selected from the class consisting of ferric ion, cobaltic ion and cupric ion.

5. A process of claim 2 in which the blix solution comprises a water-soluble thiosulfate and sodium ferric ethylene diamine tetraacetic acid.

6. A process of claim 2 in which the blix solution comprises a water-soluble thiocyanate and sodium ferric ethylene diamine tetraacetic acid.

7. A process of claim 2 in which the silver halide solvent in the blix solution is a mixture of ammonium thiosulfate and ammonium thiocyanate, and the oxidizing agent for silver is sodium ferric ethylene diamine tetraacetic acid.

8. A process of claim 2 in which the silver halide solvent in the blix solution is a mixture of ammonium thiocyanate and 3,6-dithia-1,8-octanediol, and the oxidizing agent for silver is sodium ferric ethylene diamine tetraacetic acid.

9. A process of claim 2 in which the silver halide solvent in the blix solution is a mixture of ammonium thiocyanate and 3,6-dithia-1,8-octanediol, and the oxidizing agent is potassium ferricyanide.

10. A process of claim 2 in which the silver halide solvent in the blix solution is a mixture of ammonium thiosulfate and ammonium thiocyanate and the oxidizing agent for silver is sodium cobaltic ethylene diamine tetraacetic acid.

11. A process of claim 2 in which the silver halide solvent in the blix solution is a mixture of ammonium thiosulfate and ammonium thiocyanate and the oxidizing agent for silver is sodium cupric nitrilotriacetic acid.

12. A process of claim 2 in which the silver halide solvent in the blix solution is a water-soluble thiosulfate and the oxidizing agent for silver is cobaltic ammonium nitrate.

13. A process of claim 2 in which the silver halide solvent in the blix solution is a water-soluble thiosulfate and the oxidizing agent for silver is a water-soluble ferricyanide.

14. A process of claim 2 in which the silver halide solvent in the blix solution is 3,6-dithia-1,8-octanediol and the oxidizing agent for silver is quinone.

15. A color process for a latent image exposed light-sensitive color photographic element comprising a support having coated thereon a blue-sensitive gelatino silver halide emulsion containing a nondiffusion yellow dye-forming coupler that reacts with oxidized primary aromatic amine color developing agent to form a yellow dye and substantially no residual uncolored form of said yellow dye, said coupler having the formula:

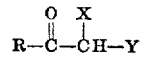

wherein R represents [a group selected from the class consisting of an alkyl] *a t-butyl* group [, an aromatic group, and a heterocyclic group]; X represents a group selected from the class consisting of the cyano group and a carbamyl group; and Y represents a coupling off group selected from the class consisting of the chlorine atom, the fluorine atom, the thiocyano group, an acyloxy group, a cyclooxy group, an alkoxy group, an alkthio group and an arylthio group; a green-sensitized gelatino silver halide emulsion containing an aldehyde reactive 5 - pyrazolone magenta dye-forming coupler having one of the formulas:

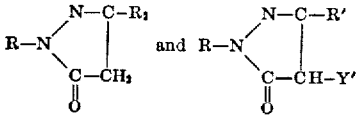

wherein R is as described previously; R′ represents a group selected from the class consisting of an alkyl group, a carbamyl group, an amino group, and an amido group; Y′ represents a coupling off group selected from the class consisting of the thio-cyano group, an acyloxy group, an aryloxy group, an alkoxy group, an alkthio group, an arylthio group, the chlorine atom, the fluorine atom and the sulfone group; and a red-sensitized gelatino silver halide emulsion containing a cyan dye-forming coupler, said photographic element being [substantially free of aldehyde hardening agents] *hardened with a divinylsulfone hardening agent* and substantially free of *aldehyde and* aldehyde-releasing hardening agents, said process comprising the steps:

(1) color developing the said latent image exposed phtographic element by contacting it with an alkaline solution of a primary aromatic amine color developing agent to convert the said latent image in the said first silver halide emulsion into the corresponding silver image and yellow dye image with substantially no residual uncolored form of said yellow dye, to convert the said latent image in the said second silver halide emulsion into the corresponding silver and magenta dye images with substantially no uncolored form of the said magenta dye, and to convert the said latent image in the said third silver halide emulsion into the corresponding silver and cyan dye image, and (2) blixing the said color developed photographic element by contacting it with an aqueous blix solution containing the silver halide solvent selected from the class consisting of a water-soluble thiosulfate, a water-soluble thiocyanate, a water-soluble organic diol fixing agent, a water-soluble sulfur-containing dibasic acid, a water-soluble salt of a sulfur-containing dibasic acid and imidazolidinthione, and an oxidizing agent for silver selected from the class consisting of a water-soluble ferricyanide, a water soluble quinone, a simple water-soluble ferric salt, a simple water-soluble cupric salt, a simple water-soluble cobaltic salt and complex salts of an alkali metal and polyvalent cation with an organic acid having one of the formulas:

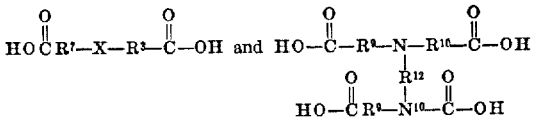

wherein X represents a member selected from the class consisting of a hydrocarbon residue, oxygen, sulfur and an $=NR^{12}$ group; $R^7$, $R^8$, $R^9$, $R^{10}$ and $R^{11}$ each represent a hydrocarbon residue, and $R^{12}$ represents a member selected from the class consisting of hydrogen and a hydrocarbon residue, and wherein the polyvalent cation is selected from the class consisting of ferric ion, cobaltic ion and cupric ions, to convert the silver and silver halide in the photographic element into water-soluble compounds from the photographic element and to leave the said yellow dye image, the said magenta dye image and the said cyan dye image with substantially no uncolored form of said dye images.

16. The color process of claim 2 in which the said photographic element contains as the nondiffusible yellow dye-forming coupler a coupler selected from the class consisting of:

[α-o-methoxy benzoyl-α-chloro-4-[α-(2,4-di-tert-amylphenoxy)-m-butyramido]acetanilide.]

α-fluoro-α[pivalyl-5-[γ-(2,4-di-tert-amylphenoxy) butyramido]-2-fluoroacetanilide.

[α-acetoxy-α-{3-[γ-(2,4-di-tert-amylphenoxy) butyramido]benzoyl}-2-methoxy acctanilide,]

α-pivalyl-α-stearoyloxy-4-sulfamylacctanilide, *and*

α-pivalyl-α-[4-(4-benzoyloxyphenylsulfonyl)phenoxy]-2-chloro-5-[γ-(2,4-di-tert-amylphenoxy)butyramido] acetanilide, and the magenta dye-forming coupler is selected from the class consisting of 1-(2′,4′-dichlorophenyl)-3-[3″-(2‴,4‴-di-tert-amylphenoxyacetamido)benzamido]-5-pyrazolone, 1-(2,4-dimeethyl-6-chlorophenyl)-3-[3-{α-m-pentadecylphenoxy)butyramido}-benzamido]-5-pyrazolone, 1-(2,4,6-trichlorophenyl)-}-(4-nitroanilino)-4-stearoyloxy-5-pyrazolone, 1-(2,4,6-trichlorophenyl)-3-{3-[α-(2,4-di-tert-amylphenoxy)acetamido]benzamido}-4-acetoxy-5-pyrazolone.

1-(2,4,6-trichlorophenyl)-3-[3(2,4-di-tert-amylphenoxyacetamido)benzamido]4-thiocyano-5-pyrazolone.

and the cyan dye-forming coupler is selected from the class consisting of

2-[α-(4′-tert-butylphenoxy)propionylamino]phenol, 2-(4″(tert-amyl-3′-phenoxybenzoylamino)3.6-dimethylphenol, 2-[α-(2,5-di-tert-amylphenoxy)butyramido]-4,6-dichloro-5-methylphenol, 1-hydroxy-4-(4-chlorophenoxy)-2′-tetradecyloxy-2-naphthanilide.

17. A light-sensitive color photographic element comprising a support having coated thereon hydrophilic colloid containing a first silver halide emulsion sensitive to one region of the visible spectrum and contiguous to said first silver halide emulsion a nondiffusible *alkyl* ketomethylene open-chain yellow dye-forming coupler that reacts with oxidized primary aromatic amine color developing agent to form a yellow dye and substantially no residual uncolored form of said yellow dye, a second silver halide emulsion sensitive to a second region of the visible spectrum and contiguous to said second silver halide emulsion a nondiffusible 5-pyrazolone which reacts with oxidized primary aromatic amine color developing agent to form a magenta dye, and a third silver halide emulsion sensitive to a third region of the visible spectrum and contiguous to the said third silver halide emulsion a nondiffusible coupler which reacts with oxidized primary aromatic amine color developing agent to form a cyan dye, which photographic element is *hardened with a divinylsulfone hardening agent* and [substantially free of aldehyde hardening agents] substantially free of *aldehyde and* aldehyde-releasing hardening agents and can be color developed and blixed and does not need to have a separate bleach following said blix.

18. A light-sensitive color photographic element comprising a support having coated thereon a blue-sensitive gelatino silver halide emulsion containing a nondiffusible yellow dye-forming coupler that reacts with oxidized primary aromatic amine color developing agent to form a yellow dye and substantially no residual uncolored form of said yellow dye, said coupler having the formula:

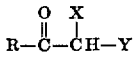

wherein R represents a *t-butyl* [group selected from the class consisting of an alkyl] group [, an aromatic group, and a hetero-cyclic group]; X represents a group selected from the class consisting of the cyano group and a carbamyl group; and Y represents a coupling-off group selected from the class consisting of the chlorine atom, the fluorine atom, the thiocyano group, an acyloxy group, cyclooxy group, an alkoxy group, an alkthio group and an arylthio group; a green-sensitized gelatino silver halide emulsion containing an aldehyde reactive 5-pyrazolone magenta dye-forming coupler having one of the formulas:

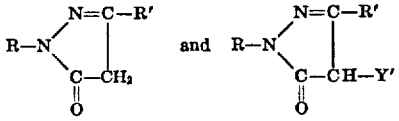

wherein R is as described previously; R′ represents a group selected from the class consisting of an alkyl group, a carbamyl group, an amino group and an amido group; Y′ represents a coupling-off group selected from the class consisting of the thiocyano group, an acyloxy group, an aryloxy group, an alkoxy group, an alkthio group, an arylthio group, the chlorine atom, the fluorine atom and the sulfone group; and a red-sensitized gelatino silver halide emulsion containing a cyan dye-forming coupler, which photographic element is *hardened with a divinylsulfone hardening agent* [substantially free of aldehyde hardening agents] substantially free of *aldehyde and* aldehyde-releasing hardening agents and can be color developed and blixed and does not need to have a separate bleach following said blix.

19. A photographic element of claim 18 in which the yellow dye-forming coupler is selected from the class consisting of:

[α-o-methoxy benzoyl-α-chloro-4[α-(2,4-tert-amylphenoxy)-m-butyramido]acetanilide,]

α-fluoro-α-pivalyl-5-[γ-(2,4-di-tert-amylphenoxy)butyramido]-2-fluoroacetanilide.

[α-acetoxy-α{3-[γ-(2,4-di-tert-amylphenoxy)butyramido]benzoyl}-2-methoxy acetanilide,]

α-pivalyl-α-stearoyloxy-4-sulfamylacetanilide,
α-pivalyl-α-[4-(4-benzoyloxyphenylsulfonyl)phenoxy]-2-chloro-5-[γ-(2,4-di-tert-amylphenoxy)butyramido] acetanilide, and the magenta dye-forming coupling is selected from the class consisting of:

1-(2',4'-dichlorophenyl)-3-[3''-(2''',4'''-di-tert-amylphenoxyacetamido)benzamido]-5-pyrazolone.
1-(2,4-dimethyl-6-chlorophenyl)-3-[3-{α-(m-pentadecylphenoxy)butyramido}-benzamido]-5-pyrazolone,
1-(2,4,6-trichlorophenyl)-3-(4-nitroanilino)-4-stearoyloxy-5-pyrazolone.
1-2,4,6-trichlorophenyl)-3-{3-[α(2,4-di-tert-amylphenoxy)acetamido]benzamido}-4-acetoxy-5-pyrazolone,
1-(2,4,6-trichlorophenyl)-3-[3-2,4--di-tert-amylphenoxyacetamido)benzamido]-4-thiocyano-5-pyrazolone, and the cyan dye-forming coupler is selected from the class consisting of 2-[α-(4'-tert-butylphenoxy)propionylamino]phenol,
2-(4''-tert-amyl-3--phenoxybenzoylamino)-3,6-dimethylphenol,
2-[α-(2,5-di-tert-amylphenoxy)butyramido]-4,6-dichloro-5-methylphenol, 1-hydroxy-4-(4-chlorophenoxy)-2'-tetradecyloxy-2-naphthanilide.

[20. A light-sensitive element of claim 17 in which the hydrophilic colloid is hardened with a divinylsulfone hardening agent.]

21. A light-sensitive element of claim 18 in which the gelatino silver halide emulsions contain gelatin that is hardened with bis(2-vinylsulfonylmethyl)ether.

References Cited

UNITED STATES PATENTS

| | | | |
|---|---|---|---|
| 2,725,295 | 12/1955 | Allen et al. | 96—111 |
| 2,726,162 | 12/1955 | Allen et al. | 96—111 X |
| 3,132,945 | 5/1964 | Ryan | 96—111 X |
| 3,148,062 | 9/1964 | Whitmore et al. | 96—22 X |
| 3,189,452 | 6/1965 | Bard | 96—22 X |
| 3,227,550 | 1/1966 | Whitmore et al. | 96—22 X |
| 3,255,000 | 6/1966 | Gates | 96—111 |

RONALD H. SMITH, Primary Examiner

JOHN L. GOODROW, Assistant Examiner

U.S. Cl. X.R.

96—111